(12) United States Patent
Opdenbosch et al.

(10) Patent No.: US 8,978,373 B2
(45) Date of Patent: Mar. 17, 2015

(54) METERLESS HYDRAULIC SYSTEM HAVING FLOW SHARING AND COMBINING FUNCTIONALITY

(75) Inventors: Patrick Opdenbosch, Peoria, IL (US); Lawrence J. Tognetti, Peoria, IL (US); Bryan J. Hillman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 670 days.

(21) Appl. No.: 13/278,924

(22) Filed: Oct. 21, 2011

(65) Prior Publication Data

US 2013/0098016 A1     Apr. 25, 2013

(51) Int. Cl.
*F15B 11/17*     (2006.01)
*E02F 9/22*     (2006.01)

(52) U.S. Cl.
CPC ............... *F15B 11/17* (2013.01); *E02F 9/2242* (2013.01); *E02F 9/2289* (2013.01); *E02F 9/2292* (2013.01); *E02F 9/2296* (2013.01); *F15B 2211/20546* (2013.01); *F15B 2211/20561* (2013.01); *F15B 2211/20569* (2013.01); *F15B 2211/20576* (2013.01); *F15B 2211/255* (2013.01); *F15B 2211/265* (2013.01); *F15B 2211/27* (2013.01); *F15B 2211/30525* (2013.01); *F15B 2211/30575* (2013.01);
(Continued)

(58) Field of Classification Search
CPC ........... F15B 11/17; F15B 2211/20546; F15B 2211/20561; F15B 2211/265; F15B 2211/3111; F15B 2211/3116; F15B 2211/3144; F15B 2211/7053; F15B 2211/7058; E02F 9/2285; E02F 9/2289; E02F 9/2292; E02F 9/2228; E02F 9/2296
USPC ............................ 60/420, 421, 422, 484, 486
See application file for complete search history.

(56) References Cited

U.S. PATENT DOCUMENTS 4,369,625 A *   1/1983   Izumi et al. .................... 60/421
4,449,366 A     5/1984   Sato et al.
(Continued)

FOREIGN PATENT DOCUMENTS

EP     1288505 A1     3/2003
EP     1 598 561     11/2005
(Continued)

OTHER PUBLICATIONS

Linjama, M., entitled "Digital Fluid Power-State of the Art", The 12th Scandinavian International Conference on Fluid Power, Tampere, Finland (May 18-20, 2011).
(Continued)

*Primary Examiner* — Thomas E Lazo
(74) *Attorney, Agent, or Firm* — Finnegan, Henderson, Farabow, Garrett & Dunner, LLP

(57) ABSTRACT

A hydraulic system includes a variable-displacement first pump, a variable-displacement second pump, and a first actuator selectively connected either to the first pump in a closed loop manner and not the second pump, or to the first and second pumps in a closed loop manner. The hydraulic system also includes a second actuator selectively connected either to the second pump in a closed loop manner and not the first pump, or to the first and second pumps in a closed loop manner. The hydraulic system further includes a variable-displacement rotary actuator selectively connected either to the first pump in a closed loop manner and not the second pump, or to the first and second pumps in a closed loop manner.

20 Claims, 2 Drawing Sheets

(52) U.S. Cl.
CPC .. *F15B 2211/30595* (2013.01); *F15B 2211/35* (2013.01); *F15B 2211/613* (2013.01); *F15B 2211/7142* (2013.01); *F15B 2211/763* (2013.01); *F15B 2211/78* (2013.01)
USPC ............................................. 60/421; 60/422

(56) References Cited

U.S. PATENT DOCUMENTS

| | | | |
|---|---|---|---|
| 4,561,249 A * | 12/1985 | Watanabe et al. ............... | 60/421 |
| 4,586,330 A | 5/1986 | Watanabe et al. | |
| 4,768,339 A | 9/1988 | Aoyagi et al. | |
| 4,833,798 A | 5/1989 | Ehrich | |
| 5,048,293 A | 9/1991 | Aoyagi | |
| 5,329,767 A | 7/1994 | Hewett | |
| 6,145,287 A | 11/2000 | Rosskopf | |
| 6,330,797 B1 | 12/2001 | Kondo | |
| 6,745,992 B2 | 6/2004 | Yang et al. | |
| 6,789,335 B1 | 9/2004 | Kinugawa et al. | |
| 6,918,247 B1 | 7/2005 | Warner | |
| 7,243,591 B2 | 7/2007 | Dixen et al. | |
| 7,260,931 B2 | 8/2007 | Egelja et al. | |
| 7,272,928 B2 | 9/2007 | Ariga et al. | |
| 7,412,827 B2 | 8/2008 | Verkuilen | |
| 7,434,391 B2 | 10/2008 | Asam et al. | |
| 7,490,421 B1 | 2/2009 | Pletzer et al. | |
| 7,516,613 B2 | 4/2009 | Kadlicko | |
| 2004/0083629 A1 | 5/2004 | Kondou | |
| 2004/0123499 A1 | 7/2004 | Arii | |
| 2005/0012337 A1 | 1/2005 | Yoshimatsu | |
| 2005/0036894 A1 | 2/2005 | Oguri | |
| 2007/0044463 A1 | 3/2007 | VerKuilen et al. | |
| 2008/0250783 A1 | 10/2008 | Griswold | |
| 2008/0300757 A1 | 12/2008 | Kanayama et al. | |
| 2008/0314038 A1 | 12/2008 | Tozawa et al. | |
| 2009/0165450 A1 | 7/2009 | Cherney et al. | |
| 2009/0288408 A1 | 11/2009 | Tozawa et al. | |
| 2010/0000209 A1 | 1/2010 | Wada et al. | |
| 2010/0000211 A1 | 1/2010 | Ikeda et al. | |
| 2010/0043420 A1 | 2/2010 | Ikeda et al. | |
| 2010/0107620 A1 | 5/2010 | Nelson et al. | |
| 2010/0115936 A1 | 5/2010 | Williamson et al. | |
| 2010/0162593 A1 | 7/2010 | Hughes, IV et al. | |
| 2010/0162885 A1 | 7/2010 | Hughes, IV et al. | |
| 2010/0163258 A1 | 7/2010 | Hughes, IV et al. | |
| 2010/0218493 A1 | 9/2010 | Nakamura et al. | |
| 2011/0029206 A1 | 2/2011 | Kang et al. | |
| 2011/0030364 A1 | 2/2011 | Persson et al. | |

FOREIGN PATENT DOCUMENTS

| | | |
|---|---|---|
| GB | 2 269 425 | 2/1994 |
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 10-96402 | 4/1998 |
| JP | 2005-076781 A | 3/2005 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Zimmerman, J. PhD Student/Purdue University, Center for Compact and Efficient Fluid Power PowerPoint Presentation, 2010 Annual Meeting (Jun. 14).

Zimmerman, J. et al., entitled "Hybrid Displacement Controlled Multi-Actuator Hydraulic Systems", The Twelfth Scandinavian International Conference on Fluid Power, Tampere, Finland (May 18-20, 2011).

Linde Hydraulics Brochure entitled "HPV-02. Variable Pumps for Closed Loop Operation", pp. 1-36.

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic und pneumatic 20 (1976) Nr. 4.

U.S. Appl. No. 13/222,895 by Patrick Opdenbosch et al., entitled "Meterless Hydraulic System Having Displacement Control Valve", filed Aug. 31, 2011.

U.S. Appl. No. 13/222,945 by Patrick Opdenbosch et al., entitled "Meterless Hydraulic System Having Restricted Primary Makeup" filed Aug. 31, 2011.

U.S. Appl. No. 13/222,990 by Patrick Opdenbosch et al., entitled "Meterless Hydraulic System Having Load-Holding Bypass" filed Aug. 31, 2011.

U.S. Appl. No. 13/249,932 by Bryan E. Nelson et al., entitled "Regeneration Configuration for Closed-Loop Hydraulic Systems" filed Sep. 30, 2011.

U.S. Appl. No. 13/250,067 by Patrick Opdenbosch, entitled "Meterless Hydraulic System Having Multi-Actuator Circuit" filed Sep. 30, 2011.

U.S. Appl. No. 13/250,250 by Patrick Opdenbosch, entitled "Meterless Hydraulic System Having Multi-Actuator Circuit" filed Sep. 30, 2011.

U.S. Appl. No. 13/250,002 by Michael L. Knussman, entitled "Closed-Loop Hydraulic System Having Energy Recovery" filed Sep. 30, 2011.

U.S. Appl. No. 13/250,171 of Patrick Opdenbosch, entitled "Meterless Hydraulic System Having Pump Protection" filed Sep. 30, 2011.

Zick, J., entitled "Verbesserte Leistungsausnutzung bei Erdbaumaschinen durch optimal Pumpensteuerung", Olhydraulic and pneumatic 20 (1976) Nr. 4.

U.S. Appl. No. 13/222,895 by Patrick Opdenbosch et al., entitled "Meterless Hydraulic System Having Displacement Control Valve" filed on Aug. 31, 2011.

U.S. Appl. No. 13/222,945 by Patrick Opdenbosch et al., entitled "Meterless Hydraulic System Having Restricted Primar Makeup" filed on Aug. 31, 2011.

U.S. Appl. No. 13/222,990 by Patrick Opdenbosch et al., entitled "Meterless Hydraulic System Having Load-Holding Bypass" filed on Aug. 31, 2011.

U.S. Appl. No. 13/249,932 by Bryan E. Nelson et al., entitled "Regeneration Configuration for Closed-Loop Hydraulic Systems" filed on Sep. 30, 2011.

U.S. Appl. No. 13/250,067 by Patrick Opdenbosch, entitled "Meterless Hydraulic System Having Multi-Actuator Circuit" filed on Sep. 30, 2011.

U.S. Appl. No. 13/250,002 by Michael L. Knussman, entitled "Closed-Loop Hydraulic System Having Energy Recovery" filed on Sep. 30, 2011.

U.S. Appl. No. 13/250,250 by Patrick Opdenbosch, entitled "Meterless Hydraulic System Having Multi-Actuator Circuit" filed on Sep. 30, 2011.

U.S. Appl. No. 13/250,171 of Patrick Opdenbosch, entitled "Meterless Hydraulic System Having Pump Protection" filed on Sep. 30, 2011.

U.S. Appl. No. 13/278,720 of Patrick Opdenbosch, entitled "Meterless Hydraulic System Having Multi-Circuit Recuperation" filed on Oct. 21, 2011.

U.S. Appl. No. 13/278,623 of Patrick Opdenbosch, entitled "Closed-Loop Hydraulic System Having Flow Combining and Recuperation" filed on Oct. 21, 2011.

U.S. Appl. No. 13/279,064 of Patrick Opdenbosch et al., entitled "Meterless Hydraulic System Having Flow Sharing and Combining Functionality" filed on Oct. 21, 2011.

U.S. Appl. No. 13/279,177 of Patrick Opdenbosch et al., entitled "Meterless Hydraulic System Having Flow Sharing and Combining Functionality" filed on Oct. 21, 2011.

(56) References Cited

OTHER PUBLICATIONS

U.S. Appl. No. 13/278,556 of Michael L. Knussman, entitled "Closed-Loop Hydraulic System Having Regeneration Configuration" filed on Oct. 21, 2011.
U.S. Appl. No. 13/278,894 of Patrick Opdenbosch, entitled "Hydraulic System Having Flow Combining Capabilities" filed on Oct. 21, 2011.
U.S. Appl. No. 13/278,895 of Michael L. Knussman et al., entitled "Hydraulic System" filed on Oct. 21, 2011.
U.S. Appl. No. 13/278,939 of Michael L. Knussman, entitled "Hydraulic System" filed on Oct. 21, 2011.
U.S. Appl. No. 13/278,745 of Brad A. Edler et al., entitled "Closed-Loop System Having Multi-Circuit Flow Sharing" filed on Oct. 21, 2011.
U.S. Appl. No. 13/278,650 of Michael L. Knussman, entitled "Hydraulic System Having Multiple Closed-Loop Circuits" filed on Oct. 21, 2011.
U.S. Appl. No. 13/279,479 of Brad A. Edler et al., entitled "Closed-Loop Hydraulic System Having Priority-Based Sharing" filed on Oct. 21, 2011.
U.S. Appl. No. 13/278,589 of Michael L. Knussman, entitled "Hydraulic System Having Multiple Closed-Loop Circuits" filed on Oct. 21, 2011.
U.S. Appl. No. 13/278,788 of Jeffrey L. Kuehn et al., entitled "Closed-Loop Hydraulic System Having Force Modulation" filed on Oct. 21, 2011.
U.S. Appl. No. 13/278,491 of Jeffrey L. Kuehn et al., entitled "Meterless Hydraulic System Having Sharing and Combining Functionality" filed on Oct. 21, 2011.
U.S. Appl. No. 13/278,935 of Michael L. Knussman et al., entitled "Hydraulic System" filed on Oct. 21, 2011.
Grabbel et al., "An investigation of swash plate control concepts for displacement controlled actuators," International Journal of Fluid Power, 2005, 6(2), pp. 19-36.
Wang et al., "A hydraulic circuit with dynamical compensations," Institute for Fluid Power Education, 52nd National Conference on Fluid Power (IFPE 2011), Session 19.3, 529-538 (Las Vegas, Nevada, USA, Mar. 24, 2011).
Williamson et al., "Stability and motion control of inertial loads with displacement controlled hydraulic actuators," Proceedings of the 6th Fluid Power Network International (FPNI) Ph.D. Symposium (West Lafayette, Indiana, USA, Jun. 15-19, 2010).

* cited by examiner

METERLESS HYDRAULIC SYSTEM HAVING FLOW SHARING AND COMBINING FUNCTIONALITY

TECHNICAL FIELD

The present disclosure relates generally to a hydraulic system and, more particularly, to a meterless hydraulic system having flow sharing and combining functionality.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in flow losses that reduce an overall efficiency of a hydraulic system.

An alternative type of hydraulic system is known as a meterless hydraulic system. A meterless hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A meterless hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and no throttling of a fluid flow is required.

An exemplary meterless hydraulic system is disclosed in U.S. Pat. No. 4,369,625 of Izumi et al., which published on Jan. 25, 1983 (the '625 patent). In the '625 patent, a multi-actuator meterless-type hydraulic system is described that has flow combining functionality. The hydraulic system includes a swing circuit, a boom circuit, a stick circuit, a bucket circuit, a left travel circuit, and a right travel circuit. Each of the swing, boom, stick, and bucket circuits have a pump connected to a specialized actuator in a closed-loop manner. In addition, a first combining valve is connected between the swing and stick circuits, a second combining valve is connected between the stick and boom circuits, and a third combining valve is connected between the bucket and boom circuits. The left and right travel circuits are connected in parallel to the pumps of the bucket and boom circuits, respectively. In this configuration, any one actuator can receive pressurized fluid from more than one pump such that its speed is limited by the capacity of a single pump.

Although an improvement over existing meterless hydraulic systems, the meterless hydraulic system of the '625 patent described above may still be less than optimal. In particular, operation of connected circuits of the system may only be sequentially performed. In addition, the speeds and forces of the various actuators may be difficult to control.

The hydraulic system of the present disclosure is directed toward solving one or more of the problems set forth above and/or other problems of the prior art.

SUMMARY

In one aspect, the present disclosure is directed to a hydraulic system including a variable-displacement first pump, a variable-displacement second pump, and a first actuator selectively connected either to the first pump in a closed loop manner and not the second pump, or to the first and second pumps in a closed loop manner. The hydraulic system also includes a second actuator selectively connected either to the second pump in a closed loop manner and not the first pump, or to the first and second pumps in a closed loop manner. The hydraulic system further includes a variable-displacement rotary actuator selectively connected either to the first pump in a closed loop manner and not the second pump, or to the first and second pumps in a closed loop manner.

In another aspect, the present disclosure is directed to a hydraulic system including a variable-displacement first pump, a variable-displacement second pump, a first actuator connected to the first pump in a closed loop manner, a second actuator selectively connected to the second pump in a closed loop manner, and a variable-displacement rotary actuator selectively connected to the first pump in a closed loop manner. The hydraulic system also includes a combiner valve arrangement configured to selectively connect and disconnect the second pump from the first actuator and the rotary actuator, and selectively connect and disconnect the first pump from the second actuator. The hydraulic system further includes at least one switching valve fluidly connected to at least one of the first actuator, the second actuator, or the rotary actuator. The at least one switching valve is configured to control an amount of fluid passing through a first actuator passage and a second actuator passage connected to the at least one of the first actuator, the second actuator, or the rotary actuator.

In another aspect, the present disclosure is directed to a method of operating a hydraulic system. The method includes pressurizing fluid with a first variable-displacement pump and pressurizing fluid with a second variable-displacement pump. The first and second pumps are capable of simultaneously supplying pressurized fluid to at least three actuators. The at least three actuators include a variable-displacement rotary actuator, a linear actuator, and a third actuator. The method also includes selectively controlling whether to direct fluid pressurized by the first pump and the second pump to only one of the at least three actuators, to only two of the at least three actuators simultaneously, or to three of the at least three actuators simultaneously. The method further includes returning the pressurized fluid to the first and second pumps in a closed-loop manner, adjusting displacement of the rotary actuator to control torque output of the rotary actuator, and metering the flow passing between the first and second pumps and the linear actuator to control movement of the linear actuator.

DETAILED DESCRIPTION

Figure 1:
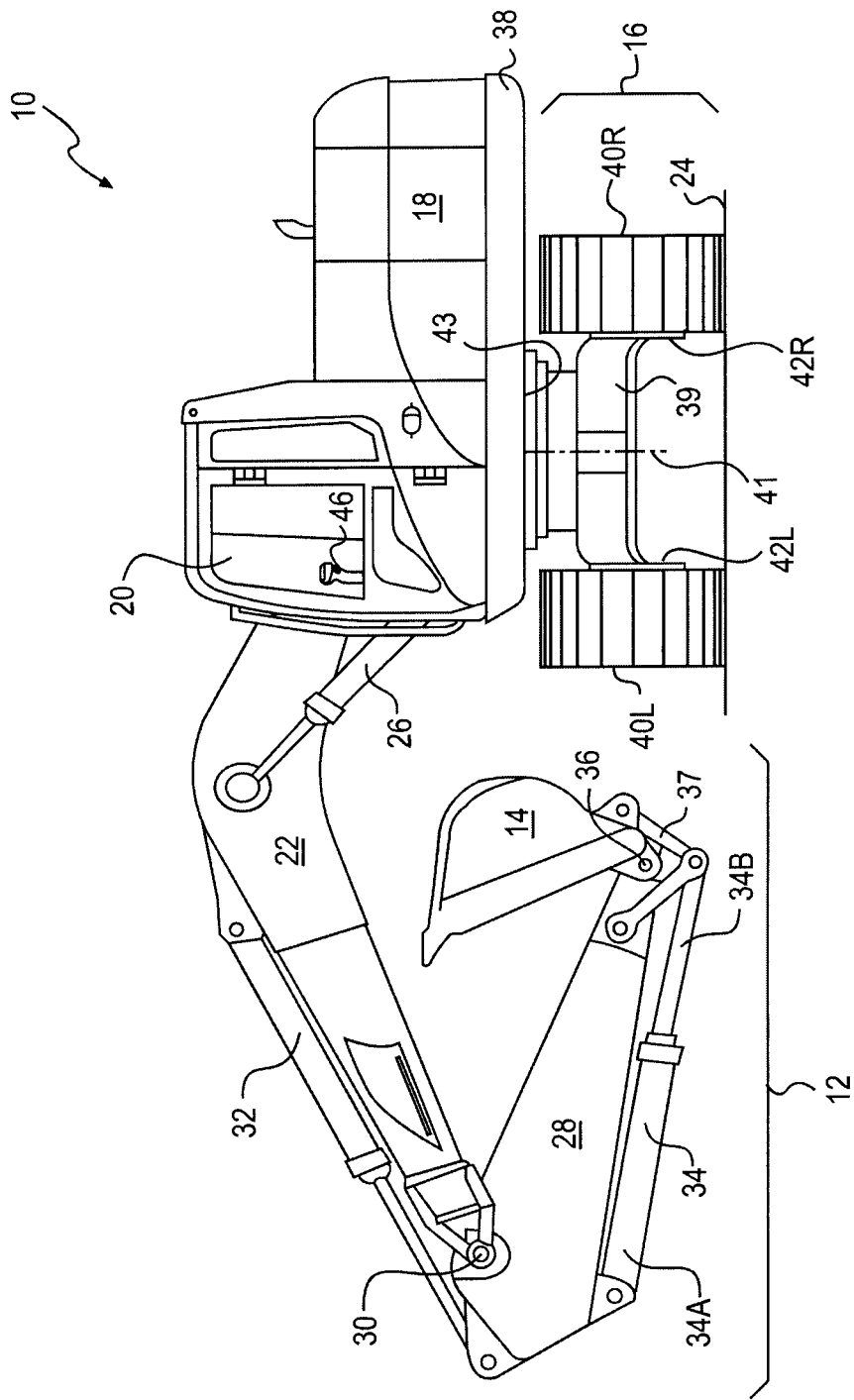
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or any other earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by fluid actuators to move work tool 14. Specifically, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected to a body 38 of machine 10. Body 38 may be pivotally connected to an undercarriage 39 and movable about a vertical axis 41 by a hydraulic swing motor 43. Stick 28 may pivotally connect boom 22 to work tool 14 by way of axis 30 and 36.

Numerous different work tools 14 may be attachable to a single machine 10 and operator controllable. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction, work tool 14 may alternatively or additionally rotate, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks such as wheels, belts, or other known traction devices. Machine 10 may be steered by generating a speed and/or rotational direction difference between left and right travel motors 42L, 42R, while straight travel may be facilitated by generating substantially equal output speeds and rotational directions from left and right travel motors 42L, 42R.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34 and left travel, right travel, and swing motors 42L, 42R, 43.

Operator station 20 may include devices that receive input from a machine operator indicative of desired machine maneuvering. Specifically, operator station 20 may include one or more operator interface devices 46, for example a joystick, a steering wheel, or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
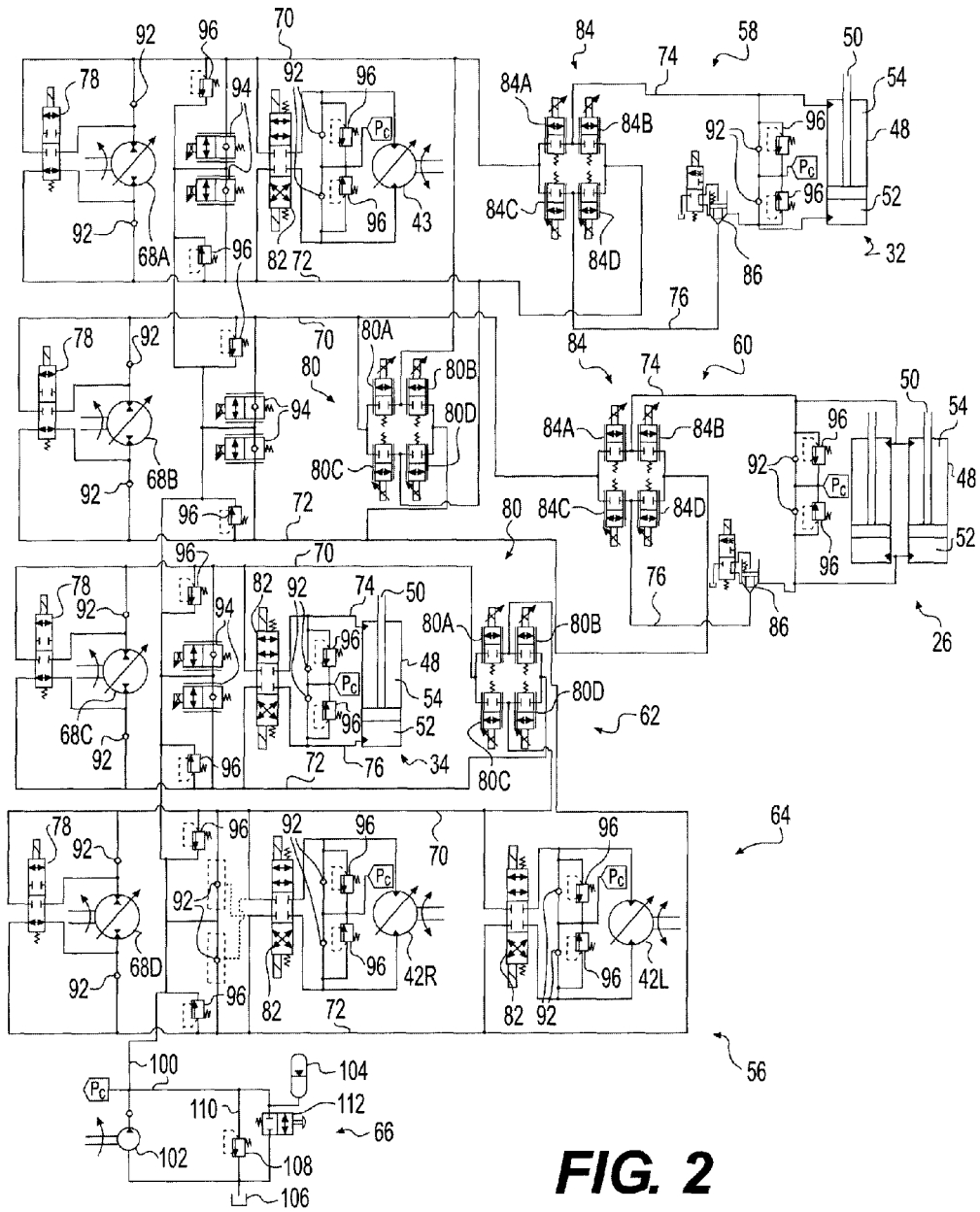
FIG. 2 is a schematic illustration of an exemplary disclosed hydraulic system that may be used in conjunction with the machine of FIG. 1.

As shown in FIG. 2, hydraulic cylinders 26, 32, 34 may each include a tube 48 and a piston assembly 50 arranged within tube 48 to form a first chamber 52 and an opposing second chamber 54. In one example, a rod portion of piston assembly 50 may extend through an end of second chamber 54. As such, second chamber 54 may be considered the rod-end chamber of hydraulic cylinders 26, 32, 34, while first chamber 52 may be considered the head-end chamber.

First and second chambers 52, 54 may each be selectively supplied with pressurized fluid and drained of the pressurized fluid to cause piston assembly 50 to displace within tube 48, thereby changing an effective length of hydraulic cylinders 26, 32, 34 and moving work tool 14 (referring to FIG. 1). A flow rate of fluid into and out of first and second chambers 52, 54 may relate to a translational velocity of hydraulic cylinders 26, 32, 34, while a pressure differential between first and second chambers 52, 54 may relate to a force imparted by hydraulic cylinders 26, 32, 34 on the associated linkage structure of implement system 12.

Swing motor 43, like hydraulic cylinders 26, 32, 34, may be driven by a fluid pressure differential. Specifically, swing motor 43 may include first and second chambers (not shown) located to either side of a pumping mechanism such as an impeller, plunger, or series of pistons (not shown). When the first chamber is filled with pressurized fluid and the second chamber is drained of fluid, the pumping mechanism may be urged to move or rotate in a first direction. Conversely, when the first chamber is drained of fluid and the second chamber is filled with pressurized fluid, the pumping mechanism may be urged to move or rotate in an opposite direction. The flow rate of fluid into and out of the first and second chambers may determine an output velocity of swing motor 43, while a pressure differential across the pumping mechanism may determine an output torque. It is contemplated that a displacement of swing motor 43 may be variable in the positive and/or negative direction (e.g., in an over-center configuration or a non-over-center configuration, as shown in FIG. 2), if desired, such that for a given flow rate and/or pressure of supplied fluid, a speed and/or torque output of swing motor 43 may be adjusted.

Similar to swing motor 43, each of left and right travel motors 42L, 42R may be driven by creating a fluid pressure differential. Specifically, each of left and right travel motors 42L, 42R may include first and second chambers (not shown) located to either side of a pumping mechanism (not shown). When the first chamber is filled with pressurized fluid and the second chamber is drained of fluid, the pumping mechanism may be urged to move or rotate a corresponding traction device (40L, 40R) in a first direction. Conversely, when the first chamber is drained of the fluid and the second chamber is filled with the pressurized fluid, the respective pumping mechanism may be urged to move or rotate the traction device in an opposite direction. The flow rate of fluid into and out of the first and second chambers may determine a velocity of left and right travel motors 42L, 42R, while a pressure differential between left and right travel motors 42L, 42R may determine a torque. It is contemplated that a displacement of left and right travel motors 42L, 42R may be variable in the positive and/or negative direction (e.g., in an over-center configuration or a non-over-center configuration, as shown in FIG. 2), if desired, such that for a given flow rate and/or pressure of supplied fluid, a speed and/or torque output of travel motors 42L, 42R may be adjusted.

As illustrated in FIG. 2, machine 10 may include a hydraulic system 56 having a plurality of fluid components that cooperate to move work tool 14 (referring to FIG. 1) and machine 10. In particular, hydraulic system 56 may include, among other things, a first meterless circuit 58, a second meterless circuit 60, a third meterless circuit 62, a fourth meterless circuit 64, and a charge circuit 66. First meterless circuit 58 may be a stick circuit associated with hydraulic cylinder 32 and swing motor 43. Second meterless circuit 60 may be a boom circuit associated with hydraulic cylinders 26. Third meterless circuit 62 may be a bucket circuit associated with hydraulic cylinder 34. Fourth meterless circuit 64 may be a travel circuit associated with right travel motor 42R and left travel motor 42L. Charge circuit 66 may be in selective fluid communication with each of first, second, third, and fourth meterless circuits 58, 60, 62, 64. It is contemplated that additional and/or different configurations of meterless circuits may be included within hydraulic system 56 such as, for example, an independent circuit associated with each separate actuator (e.g., hydraulic cylinders 32, 34, 26, left travel motor 42L, right travel motor 42R, and/or swing motor 43), if desired. Also, as an alternative, hydraulic cylinders 32 and 34 may be interchanged such that first meterless circuit 58 may be a bucket circuit associated with hydraulic cylinder 34 and swing motor 43 and third meterless circuit 62 may be a stick circuit associated with hydraulic cylinder 32.

In the disclosed embodiment, each of meterless circuits 58, 60, 62, 64 may include a plurality of interconnecting and cooperating fluid components that facilitate the use and control of the associated actuators. For example, each meterless circuit 58, 60, 62, 64 may include a respective pump 68A-68D fluidly connected to its associated rotary and/or linear actuators in parallel via a closed-loop formed by upper-side and lower-side passages. The terms "upper" and "lower" are used herein to refer to positions of the components relative to each other in FIG. 2 for ease of explanation, but the components are not limited to these relative positions in practice.

Specifically, each pump 68A, 68D that is connected to a rotary actuator (e.g., to left-travel motor 42L, right travel motor 42R, or swing motor 43) may be connected to the rotary actuator via a first pump passage 70 and a second pump passage 72. To cause the rotary actuator to rotate in a first direction, first pump passage 70 may be filled with fluid pressurized by the pump (e.g., pump 68A), while second pump passage 72 may be filled with fluid exiting the rotary actuator. To reverse direction of the rotary actuator, second pump passage 72 may be filled with fluid pressurized by the pump (e.g., pump 68A), while first pump passage 70 may be filled with fluid exiting the rotary actuator.

In addition, each pump 68A-68C that is connected to a linear actuator (e.g., to hydraulic cylinders 26, 32, or 34) may be connected to the linear actuator via first and second pump passages 70, 72, a rod-end passage 74, and a head-end passage 76. During an extending operation of a particular linear actuator, head-end passage 76 may be filled with fluid pressurized by one or more pumps 68A-68C, while rod-end passage 74 may be filled with fluid returned from the linear actuator. In contrast, during a retracting operation, rod-end passage 74 may be filled with fluid pressurized by one or more pumps 68A-68C, while head-end passage 76 may be filled with fluid returned from the linear actuator.

Each pump 68A-68D may have variable displacement and be controlled to draw fluid from its associated actuators and discharge the fluid at a specified elevated pressure back to the actuators in two different directions. That is, each pump 68A-68D may include a stroke-adjusting mechanism, for example a swashplate, a position of which is hydro-mechanically or electro-hydraulically adjusted based on, among other things, a desired speed of the actuators to thereby vary an output (e.g., a discharge rate) of pumps 68A-68D. The displacement of each pump 68A-68D may be adjusted from a zero displacement position at which substantially no fluid is discharged from the respective pump 68A-68D, to a maximum displacement position in a first direction at which fluid is discharged from the respective pump 68A-68D at a maximum rate into first pump passage 70. Likewise, the displacement of each pump 68A-68D may be adjusted from the zero displacement position to a maximum displacement position in a second direction at which fluid is discharged from the respective pump 68A-68D at a maximum rate into second pump passage 72. Each pump 68A-68D may be drivably connected to power source 18 of machine 10 by, for example, a countershaft, a belt, or in another suitable manner. Alternatively, each pump 68A-68D may be indirectly connected to power source 18 via a torque converter, a gear box, an electrical circuit, or in any other manner known in the art. It is contemplated that pumps 68A-68D of different circuits may be connected to power source 18 in tandem (e.g., via the same shaft) or in parallel (via a gear train), as desired.

As shown in FIG. 2, pumps 68A-68D may be over-center pumps or rotatable in opposing directions to produce flows of pressurized fluid in two directions. Each pump 68A-68D may be fluidly connected to a back flow preventor valve 78 that is configured to prevent back flow of pressurized fluid into the respective pump 68A-68D. Alternatively, one or more of pumps 68A-68D and corresponding back flow preventor valve 78 may be replaced by a pump configured to produce only a unidirectional flow of pressurized fluid and a check valve for preventing back flow of pressurized fluid into the pumps 68A-68D. Also, back flow preventor valve 78 may be an electro-hydraulic valve (as shown in FIG. 2), a hydro-mechanical valve (e.g., controlled by the controller controlling displacement of pumps 68A-68D), etc.

One or more pumps 68A-68D may also be selectively operated as a motor. More specifically, when an associated actuator is operating in an overrunning condition (e.g., a condition in which the load drives the actuator), the fluid discharged from the actuator may have a pressure elevated higher than an output pressure of the corresponding pump(s) 68A-68D. In this situation, the elevated pressure of the actuator fluid directed back through the corresponding pump(s) 68A-68D may function to drive the corresponding pump(s) 68A-68D to rotate with or without assistance from power source 18. Under some circumstances, one or more pumps 68A-68D may even be capable of imparting energy to power source 18, thereby improving an efficiency and/or capacity of power source 18.

It may be desirable to fluidly connect an actuator to more than one of pumps 68A-68D simultaneously. For this purpose, a combiner valve arrangement 80 may fluidly connect two or more meterless circuits 58, 60, 62, 64. For example, in the disclosed embodiment, one combiner valve arrangement 80 is configured to fluidly connect meterless circuits 58, 60, and another combiner valve arrangement 80 is configured to fluidly connect meterless circuits 62, 64. The following discussion relates to combiner valve arrangement 80 of meterless circuits 58, 60, but it is understood that the same description applies to combiner valve arrangement 80 of meterless circuits 62, 64.

By controlling combiner valve arrangement 80, the actuators in meterless circuit 58 (e.g., hydraulic cylinder 32 and swing motor 43) may be selectively connected only to pump 68A in a closed loop manner, or to both pumps 68A and 68B in a closed loop manner. Also, the actuators in meterless circuit 60 (e.g., hydraulic cylinders 26) may be selectively connected only to pump 68B in a closed loop manner, or to both pumps 68A and 68B in a closed loop manner.

Combiner valve arrangement 80 may include up to four independent metering cartridge valves. For example, in the disclosed embodiment, each combiner valve arrangement 80 includes a first upper valve 80A, a second upper valve 80B, a first lower valve 80C, and a second lower valve 80D. Alternatively, each combiner valve arrangement 80 may be realized using other types of valves, such as spool valves, poppet valves, etc. Valves 80A-80D may be on/off type valves, or proportional valves that are adjustable between full and partial flow-passing positions and a flow-blocking position. For example, valves 80A-80D may be solenoid-actuated between full and partial flow-passing positions, and spring-biased to the flow-blocking position. First upper valve 80A may be positioned between first pump passages 70 of first and second meterless circuits 58, 60. Second upper valve 80B may be positioned between second pump passage 72 of second meterless circuit 60 and first pump passage 70 of first meterless circuit 58. First lower valve 80C may be positioned between first pump passage 70 of second meterless circuit 60 and second pump passage 72 of first meterless circuit 58. Second lower valve 80D may be positioned between second pump passages 72 of first and second meterless circuits 58, 60.

Valves 80A-80D provide flow-combining functionality to allow each actuator of meterless circuits 58, 60 to be fluidly connected in a closed loop manner to both pumps 68A and 68B simultaneously. When it is desired to provide pressurized fluid from both pumps 68A and 68B to the actuators, valves 80A-80D are positioned depending on, for example, the direction of discharge of fluid from pumps 68A, 68B and/or the desired direction of movement of the actuators. For example, when first pump passages 70 of first and second meterless circuits 58, 60 are pressurized by pumps 68A, 68B, first upper valve 80A may be moved to its flow-passing position such that pressurized fluid from pumps 68A, 68B to respective first pump passages 70 of first and second meterless circuits 58, 60 may combine and be supplied to the actuators via their associated switching valve, such as spool switching valve 82 or switching valve arrangements 84 (described below). At this same time, second lower valve 80D may be in its flow-passing position so that flow discharged from the actuators, which passes through their associated spool switching valve 82 or switching valve arrangements 84, may be directed to second pump passages 72 of first and second meterless circuits 58, 60 and back to pumps 68A, 68B. In this configuration, swing motor 43 and hydraulic cylinders 26, 32 are connected in a closed loop manner to pumps 68A and 68B.

Accordingly, valves 80A-80D are configured to communicate a combined flow from pumps 68A and 68B to the actuators via spool switching valve 82 or switching valve arrangements 84. As described below, spool switching valve 82 may be controlled to direct flow to one chamber of swing motor 43 and discharge flow from the other chamber to effect movement of the pumping mechanism of swing motor 43. Switching valve arrangements 84 may be controlled to direct flow to first or second chamber 52, 54 of hydraulic cylinders 26, 32 and discharge flow from the other one of first or second chamber 52, 54 to effect retraction or extension of the hydraulic cylinders 26, 32. Thus, spool switching valve 82 and switching valve arrangements 84 may be controlled to determine which chambers of the actuators receive or discharge fluid and the rate at which fluid is received/discharged.

In certain situations, it may be desirable to direct substantially all flow from both pumps 68A and 68B to only one of the actuators in meterless circuits 58, 60. In those situations, spool switching valve 82 and/or switching valve arrangements 84 associated with the actuators may be controlled to block flow to the associated actuator. For example, if it is desirable to direct substantially all flow from both pumps 68A and 68B to hydraulic cylinders 26, then spool switching valve 82 associated with swing motor 43 and valves 84A-84D (described below) of switching valve arrangement 84 associated with hydraulic cylinder 32 may be moved to their respective flow-blocking positions. In this configuration, hydraulic cylinders 26 are the only actuators that are connected in a closed loop manner to pumps 68A and 68B. Alternatively, if it is desirable to direct substantially all flow from both pumps 68A and 68B to hydraulic cylinder 32, then spool switching valve 82 associated with swing motor 43 and valves 84A-84D of switching valve arrangement 84 associated with hydraulic cylinders 26 may be moved to their respective flow-blocking positions. In this configuration, hydraulic cylinder 32 is the only actuator that is connected in a closed loop manner to pumps 68A and 68B.

Valves 80A-80D are positioned in their flow-blocking positions when it is desired to provide pressurized fluid from pump 68A only to the actuators of first meterless circuit 58 (e.g., swing motor 43 and hydraulic cylinder 32) and to provide pressurized fluid from pump 68B only to the actuator of the second meterless circuit 60 (e.g., hydraulic cylinder 26) without combining the flows. In this configuration, swing motor 43 and hydraulic cylinder 32 are connected in a closed loop manner only to pump 68A, and hydraulic cylinders 26 is connected in a closed loop manner only to pump 68B.

Combiner valve arrangement 80 of meterless circuits 62, 64 may operate similarly to combiner valve arrangement 80 of meterless circuits 58, 60, as described above. Thus, combiner valve arrangement 80 of meterless circuits 62, 64 may provide flow-combining functionality to allow the actuators of meterless circuits 62, 64 to be fluidly connected in a closed loop manner to both pumps 68C and 68D. Combiner valve arrangement 80 of meterless circuits 62, 64 may also allow the actuator of meterless circuit 62 (e.g., hydraulic cylinder 34) to be fluidly connected in a closed loop manner only to pump 68C, and to allow the actuators of meterless circuit 64 (e.g., left and right travel motors 42L, 42R) to be fluidly connected in a closed loop manner only to pump 68D.

As described above, a switching valve, such as spool switching valve 82 or switching valve arrangement 84, may be fluidly connected to each actuator to control or meter flow to and from the chambers of each actuator. For example, spool switching valve 82 associated with swing motor 43 may meter flow to and from the chambers of swing motor 43, and switching valve arrangement 84 associated with hydraulic cylinder 32 may meter flow to and from first and second chambers 52, 54. As a result, spool switching valves 82 and switching valve arrangements 84 allow speed and/or directional adjustment of an actuator independently from other actuators, such as the actuators within the same closed loop. Other types of switching valves may be provided as known in the art. Further, spool switching valve 82 and switching valve arrangement 84 may be substituted for each other. For example, switching valve arrangements 84 may be replaced by spool switching valves 82 in certain applications, or vice versa.

Spool switching valve 82 may be provided in meterless circuits 58, 62, 64 to provide flow-switching functionality and is fluidly connected to hydraulic cylinder 34, left-travel motor 42L, right travel motor 42R, and swing motor 43, respectively. Spool switching valve 82 may be positioned between first and second pump passages 70, 72 to control the amount of fluid supplied to the actuator or discharged from the actuator. For example, swing motor 43 may include first and second actuator passages, and spool switching valve 82 may control the rate of flow through the actuator passages. In the disclosed embodiment, spool switching valves 82 may be on/off type valves, or proportional valves that are adjustable between full and partial flow-passing positions and a flow-blocking position. For example, the valves may be solenoid-actuated between full and partial flow-passing positions, and spring-biased to the flow-blocking position. When spool switching valves 82 are in the flow-blocking positions, fluid flowing within first and second pump passages 70, 72 may not pass through and substantially affect the motion of the actuator.

Switching valve arrangement 84 may be provided in meterless circuits 58, 60, and fluidly connected to the associated linear actuators (e.g., hydraulic cylinders 26, 32). Switching valve arrangement 84 may include four valves, including a first rod-end valve 84A, a second rod-end valve 84B, a first head-end valve 84C, and a second head-end valve 84D. First rod-end valve 84A may be positioned between first pump passage 70 and rod-end passage 74 in the respective meterless circuit 58, 60. Second rod-end valve 84B may be positioned between second pump passage 72 and rod-end passage 74 in the respective meterless circuit 58, 60. First head-end valve 84C may be positioned between first pump passage 70 and head-end passage 76 in the respective meterless circuit 58, 60. Second head-end valve 84D may be positioned between second pump passage 72 and head-end passage 76 in the respective meterless circuit 58, 60. Like spool switching valves 82, valves 84A-84D may be on/off type valves, or proportional valves that are adjustable between full and partial flow-passing positions and a flow-blocking position. For example, valves 84A-84D may be solenoid-actuated between full and partial flow-passing positions, and spring-biased to the flow-blocking position.

Valves 84A-84D provide flow-switching functionality. For example, there may be times when movement of swing motor 43 in the first direction and retraction of hydraulic actuator 32 is desired, while at other times movement of swing motor 43 in the first direction and extension of hydraulic actuator 32 is desired. During the first situation, pump 68A and/or pump 68B may be required to pressurize first pump passage 70 in first meterless circuit 58 and rod-end passage 74, while during the second situation, pump 68A and/or pump 68B may be required to pressurize first pump passage 70 in first meterless circuit 58 and head-end passage 76. Valves 84A-84D may facilitate these operations. For example, when first pump passage 70 in first meterless circuit 58 is pressurized by pump 68A and/or pump 68B and retraction of the hydraulic actuator 32 is desired, first rod-end valve 84A may be moved to its flow-passing position such that rod-end passage 74 and second chamber 54 of hydraulic cylinder 32 are also pressurized. At this same time, second head-end valve 84D may be in its flow-passing position such that fluid discharged from first chamber 52 passes through head-end passage 76 to second pump passage 72 in first meterless circuit 58 and back to pump 68A. If both pumps 68A, 68B are supplying fluid to hydraulic cylinder 32 via combiner valve arrangement 80, then fluid discharged from first chamber 52 may also pass through head-end passage 76 to second pump passage 72 in second meterless circuit 60 and back to pump 68B. In contrast, when first pump passage 70 in first meterless circuit 58 is pressurized by pump 68A and/or pump 68B and extension of hydraulic actuator 32 is desired, first head-end valve 84C may be moved to its flow-passing position such that head-end passage 76 and first chamber 52 of hydraulic actuator 32 are also pressurized. At this same time, second rod-end valve 84B may be in its flow-passing position such that fluid discharged from second chamber 54 passes through rod-end passage 74 to second pump passage 72 in first meterless circuit 58 and back to pump 68A. If both pumps 68A, 68B are supplying fluid to hydraulic cylinder 32 via combiner valve arrangement 80, then fluid discharged from second chamber 54 may also pass through head-end passage 76 to second pump passage 72 in second meterless circuit 60 and back to pump 68B. Similar movements of valves 84A-84D may be initiated to provide for movement of swing motor 43 in the second direction during extensions and retractions of hydraulic cylinder 32. Also, switching valve arrangement 84 associated with hydraulic cylinders 26 may also be operated similarly to extend and retract hydraulic cylinders 26 when both pumps 68A, 68B are providing fluid to hydraulic cylinders 26.

In some embodiments, switching valve arrangements 84 may be used to facilitate fluid regeneration within the associated linear actuator. For example, when valves 84B, 84D are moved to their flow passing positions and valves 84A, 84C are in their flow-blocking positions, high-pressure fluid may be transferred from one chamber to the other of the linear actuator via valves 84B, 84D, without the fluid ever passing through pumps 68A, 68B. This operation may help to reduce loads on pumps 68A, 68B, while still satisfying operator demands, thereby increasing an efficiency of machine 10. Similar functionality may alternatively be achieved by moving valves 84A, 84C to their flow-passing positions while holding valves 84B, 84D in their flow-blocking positions.

Switching valves 84C, 84D may also function as load-holding valves, hydraulically locking movement of the actuator, when the actuator has a non-zero displacement and switching valves 84C, 84D are in their flow-blocking positions. Alternatively, or in addition, load holding valves 86 may be fluidly connected to hydraulic cylinders 26, 32 to perform this function.

Check valves 92 may be provided to assist in regulating make up of fluid flow, e.g., supplied by or discharged from pumps 68A-68D and/or the actuators (e.g., hydraulic cylinders 26, 32, 34, swing motor 43, left and right travel motors 42L, 42R, etc.).

It will be appreciated by those of skill in the art that the respective rates of hydraulic fluid flowing into and out of the actuators may not be equal. For example, the respective rates of hydraulic fluid flowing into and out of first and second chambers 52, 54 of hydraulic cylinders 26, 32, 34 during extension and retraction may not be equal. Because of the location of the rod portion of piston assembly 50 within second chamber 54, piston assembly 50 may have a reduced pressure area within second chamber 54, as compared with a pressure area within first chamber 52. Accordingly, during retraction of hydraulic cylinders 26, 32, 34, more hydraulic fluid may be forced out of first chamber 52 than can be consumed by second chamber 54 and, during extension, more hydraulic fluid may be consumed by first chamber 52 than is forced out of second chamber 54. In order to accommodate the excess fluid discharge during retraction and the additional fluid required during extension, each of meterless circuits 58, 60, 62 may be provided with two makeup valves 94 and two relief valves 96 that connect first and second pump passages 70, 72 to charge circuit 66 via a common passage 100. In addition, meterless circuit 64 may be provided with two check valves 92 and two relief valves 96 that connect first and second pump passages 70, 72 to charge circuit 66 via common passage 100.

Makeup valves 94 may each be a proportional valve that is disposed between common passage 100 and one of first and second pump passages 70, 72 and configured to selectively allow pressurized fluid from charge circuit 66 to enter first and second pump passages 70, 72. In particular, each of makeup valves 94 may be solenoid-actuated from a first position at which fluid freely flows between common passage 100 and the respective first and second pump passage 70, 72, toward a second position at which fluid from common passage 100 may flow only into first and second pump passage 70, 72 when a pressure of common passage 100 exceeds the pressure of first and second pump passages 70, 72 by a threshold amount. Makeup valves 94 may be spring-biased toward their second positions, and only moved toward their first positions during operations known to have need of positive or negative makeup fluid. Makeup valves 94 may also be used to facilitate fluid regeneration between first and second pump passages 70, 72 within a particular circuit, by simultaneously moving together at least partway to their first positions.

Relief valves 96 may be provided to allow fluid relief from each meterless circuit 58, 60, 62, 64 into charge circuit 66 when a pressure of the fluid exceeds a set threshold of relief valves 96. Relief valves 96 may be set to operate at relatively high pressure levels in order to prevent damage to hydraulic system 56, for example, at levels that may only be reached when hydraulic cylinders 26, 32, 34 reach an end-of-stroke position and the flow from associated pumps 68A-68D is nonzero, during a stall condition due to a large load, or during a failure condition of hydraulic system 56.

Charge circuit 66 may include at least one hydraulic source fluidly connected to common passage 100 described above. In the disclosed embodiment, charge circuit 66 has two sources, including a charge pump 102 and an accumulator 104, which may be fluidly connected to common passage 100 in parallel to provide makeup fluid to meterless circuits 58, 60, 62, 64. Charge pump 102 may embody, for example, an engine- or ground-driven, variable- or fixed-displacement pump configured to draw fluid from a tank 106, pressurize the fluid, and discharge the fluid into common passage 100. Accumulator 104 may embody, for example, a compressed gas, membrane/spring, or bladder type of accumulator configured to accumulate pressurized fluid from and discharge pressurized fluid into common passage 100. Excess hydraulic fluid, either from charge pump 102 or from meterless circuits 58, 60, 62, 64 (i.e., from operation of pumps 68A-68D and/or the rotary and linear actuators) may be directed into either accumulator 104 or into tank 106 by way of a charge relief valve 108 disposed in a return passage 110. Charge relief valve 108 may be movable from a flow-blocking position toward a flow-passing position as a result of elevated fluid pressures within common passage 100 and return passage 110. A manual service valve 112 may be associated with accumulator 104 to facilitate draining of accumulator 104 to tank 106 during service of charge circuit 66.

During operation of machine 10, the operator of machine 10 may utilize interface device 46 to provide a signal that identifies a desired movement of the various linear and/or rotary actuators to a controller (not shown). Based upon one or more signals, including the signal from interface device 46 and, for example, signals from various pressure and/or position sensors (not shown) located throughout hydraulic system 56, the controller may command movement of the different valves and/or displacement changes of the different pumps and motors to advance a particular one or more of the linear and/or rotary actuators to a desired position in a desired manner (i.e., at a desired speed and/or with a desired force).

The controller may embody a single microprocessor or multiple microprocessors that include components for controlling operations of hydraulic system 56 based on input from an operator of machine 10 and based on sensed or other known operational parameters. Numerous commercially available microprocessors can be configured to perform the functions of the controller. It should be appreciated that the controller could readily be embodied in a general machine microprocessor capable of controlling numerous machine functions. The controller may include a memory, a secondary storage device, a processor, and any other components for running an application. Various other circuits may be associated with the controller such as power supply circuitry, signal conditioning circuitry, solenoid driver circuitry, and other types of circuitry.

INDUSTRIAL APPLICABILITY

The disclosed hydraulic system may be applicable to any machine where improved hydraulic efficiency and performance is desired. The disclosed hydraulic system may provide for improved efficiency through the use of meterless technology. The disclosed hydraulic system may provide for enhanced functionality and control through the selective use of novel circuit configurations. Operation of hydraulic system 56 will now be described.

During operation of machine 10, an operator located within station 20 may command a particular motion of work tool 14 in a desired direction and at a desired velocity by way of interface device 46. One or more corresponding signals generated by interface device 46 may be provided to the controller indicative of the desired motion, along with machine performance information, for example sensor data such a pressure data, position data, speed data, pump displacement data, and other data known in the art.

In response to the signals from interface device 46 and based on the machine performance information, the controller may generate control signals directed to pumps 68A-68D, motors 43, 42L, 42R, and to valves 78, 80A-80D, 82, 84A-84D, 86, 94. For example, the operator may request via interface device 46 that hydraulic cylinder 32 be retracted. When this occurs, the controller may generate a control signal that causes pump 68A to increase its displacement and discharge fluid into first pump passage 70 of meterless circuit 58. In addition, the controller may generate a control signal that causes first rod-end valve 84A and second head-end valve 84D to move toward and/or remain in their flow-passing positions. At this time, second rod-end valve 84B and first head-end valve 84C may be in their flow-blocking positions. As fluid from pump 68A passes into second chamber 54 of hydraulic cylinder 32 via first pump and rod-end passages 70, 74, fluid may be discharged from first chamber 52 back to pump 68A via head-end and second pump passages 76, 72.

The motion of hydraulic cylinder 32 may be reversed in two different ways. First, the operation of pump 68A may be reversed, thereby reversing the flows of fluid into and out of hydraulic cylinder 32. Otherwise, the motion of hydraulic cylinder 32 may be reversed by switching the positions of first and second pump and rod- and head-end valves 84A-84D. If, during the motion of hydraulic cylinder 32, the pressure of fluid within either of first or second pump passages 70, 72 becomes excessive (for example, during an overrunning condition), fluid may be relieved from the pressurized passage to tank 106 via relief valves 96 and common passage 100. In contrast, when the fluid pressure becomes too low, fluid from charge circuit 66 may be allowed into meterless circuit 58 via common passage 100 and makeup valves 94.

During motion of hydraulic cylinder 32, the operator may simultaneously request movement of swing motor 43. For example, to rotate swing motor 43 in the first direction, the controller may generate a control signal that increases the displacement of swing motor 43. In addition, the controller may generate a control signal that causes switching valve 82 to move toward and/or remain in its flow-passing position. After fluid from pump 68A passes into and through swing motor 43 via first pump passage 70, the fluid may return to pump 68A via second pump passage 72. To reverse the motion of swing motor 43, spool switching valve 82 may adjust the direction of flow of pressurized fluid to the swing motor 43 or the output direction of pump 68A may be reversed. Also, displacement of swing motor 43 may be controlled to adjust the torque output of swing motor 43. If, during the motion of swing motor 43, the pressure of fluid within either of first or second pump passages 70, 72 becomes excessive (for example during an overrunning condition), fluid may be relieved from the pressurized passage to tank 106 via relief valves 96 and common passage 100.

During the operations described above, valves 80A-80D may be in their flow-blocking positions so that swing motor 43 and hydraulic cylinder 32 only communicate fluid in a closed loop manner with pump 68A, and hydraulic cylinders 26 only communicate fluid in a closed loop manner with pump 68B. Alternatively, each actuator (e.g., hydraulic cylinders 26, 32, 34, swing motor 43, and left and right travel motors 42L, 42R) may receive flow from one or two of pumps 68A-68D. In the disclosed embodiment, by controlling valves 80A-80D, 82, 84A-84D in meterless circuits 58, 60, each of hydraulic cylinder 32 and swing motor 43 may be selectively connected only to pump 68A in a closed loop manner or to both pumps 68A and 68B, and hydraulic cylinders 26 may be selectively connected only to pump 68B in a closed loop manner or to both pumps 68A and 68B in a closed loop manner. Similarly, by controlling valves 80A-80D, 82, 84A-84D in meterless circuits 62, 64, hydraulic cylinder 34 may be selectively connected only to pump 68C in a closed loop manner, or to both pumps 68C and 68D in a closed loop manner, and each of right travel motor 42R and left travel motor 42L may be selectively connected only to pump 68D in a closed loop manner, or to both pumps 68C and 68D in a closed loop manner.

In certain operations, it may be desirable to increase the amount of fluid communicated to the actuator(s), e.g., so that the actuator(s) may move faster, by providing fluid from more than one of pumps 68A-68D to the actuator(s). Thus, combined flow from two pumps may be provided to each actuator if an increase in speed of the actuator is desired within the power capabilities of the engine.

Combining flow from two pumps to supply to one or more actuators may also assist in ensuring that the actuators operate as desired. Each of pumps 68A-68D has a certain flow rate limit dictated by its respective maximum displacement. Certain actuators, however, may require a flow rate greater than the maximum flow provided by a single pump in order to function as desired (e.g., to fulfill cycle requirements, such as cycle timing, etc.). For example, hydraulic cylinder 32 (associated with stick 28) and hydraulic cylinders 26 (associated with boom 22) may each require flow from more than one pump in order to meet single-function performance requirements. Thus, if operation of a particular actuator is initiated and it is determined that more than one of pumps 68A-68D are needed to provide the desired flow rate to a particular actuator, then the controller may generate a control signal that causes valves 80A-80D, 82, 84A-84D to communicate a combined flow from two of pumps 68A-68D to the actuator to be operated. For example, if hydraulic cylinders 26 are moving and hydraulic cylinder 32 and swing motor 43 are not moving (and therefore do not require flow), and it is desired to increase the flow rate to hydraulic cylinders 26 so that the hydraulic cylinders 26 receive a combined flow from pumps 68A and 68B, the controller may generate a control signal that causes valves 80A-80D in meterless circuits 58, 60 to communicate flow from both pumps 68A and 68B to hydraulic cylinders 26. At the same time, switching valve arrangement 84 associated with hydraulic cylinder 32 and spool switching valve 82 associated with swing motor 43 may be moved to their flow-blocking positions. As a result, hydraulic cylinders 26 may receive sufficient flow to operate as desired due to the combined flow from both pumps 68A and 68B.

In certain situations, multiple actuators may be operated simultaneously, but the desired flow rate to the operating actuators (the commanded amount) may exceed the flow rate that the pumps are capable of supplying to those actuators. In such situations, the controller may prioritize one or more actuators so that the desired flow rate is supplied to the actuators having higher priority. For example, in certain embodiments, hydraulic cylinders 26 associated with boom 22 may have the highest priority so that if the operator is moving swing motor 43 and hydraulic cylinders 32, 26 simultaneously, the controller may ensure that hydraulic cylinders 26 receive a flow rate at a predetermined value, which may cause less flow to be directed to swing motor 43 and hydraulic cylinder 32. As another alternative, the controller may scale down the commanded rates of flow to all of the actuators being operated.

Further, in certain situations, since different actuators may operate simultaneously and require a different rate/pressure of flow to function as desired, valves 80A-80D, 82, 84A-84D may be controlled to maintain a pressure difference between meterless circuits and/or between different actuators. For example, when a combined flow from pumps 68A and 68B is communicated in a closed loop manner to hydraulic cylinders 26 and hydraulic cylinder 32, it may be desired to supply flow at a higher pressure to hydraulic cylinders 26 than hydraulic cylinder 32. Thus, the controller may generate a control signal that causes valves 80A-80D to maintain a pressure difference so that flow in meterless circuit 60 that is communicated to hydraulic cylinders 26 is at a higher pressure than flow in meterless circuit 58 that is communicated to hydraulic cylinder 32. Alternatively, or in addition, the controller may generate a control signal that causes the switching valves 84A-84D associated with respective hydraulic cylinders 26 and/or hydraulic cylinder 32 to maintain the pressure difference.

As described above, displacement control of pumps 68A-68D may depend on the desired operation of the rotary and linear actuators. When both rotary and linear actuator motion is simultaneously desired within a single circuit, however, directional displacement control of the associated pump may be driven based solely on the desired motion of the linear actuator(s) (although the displacement magnitude of pump may be based on flow requirements of both the rotary and linear actuators). Direction or speed of the linear actuator(s) may be adjusted independently from each other and the rotary actuators. In the disclosed embodiment, speed of the linear actuator(s) may be adjusted by displacement of the associated pump(s), and switching valves 82, 84 may be controlled so that a reversal of the associated linear actuator(s) does not affect other actuators. In other words, switching valves 82, 84 may switch the direction of flow. For example, pump 68A may pressurize first pump passage 70 in meterless circuit 58 in order to effect extension of hydraulic cylinder 32 and to rotate swing motor 43 clockwise. If retraction of hydraulic cylinder 32 is desired while maintaining the clockwise rotation of swing motor 43, then switching valve arrangement 84 associated with hydraulic cylinder 32 may switch the direction of flow to hydraulic cylinder 32 to effect retraction without having to adjust the direction of flow from pump 68A, which would affect the direction of rotation of swing motor 43. In order to cause the rotary actuator(s) to move in a desired direction at a desired speed and/or with a desired torque, the displacement of the rotary actuator(s) may be selectively varied. Switching valves 82 associated with the rotary actuator(s) may be actuated to control the direction of the rotary actuator(s).

Also, as described above, the positioning of valves 80A-80D and 84A-84D may depend on the desired operation of the rotary and linear actuators. As a result, hydraulic system 56 may supplement flow to one or more actuators using more than one of pumps 68A-68D. For example, if the operator does not desire to move hydraulic cylinders 26, pump 68B may be run to supplement the flow from pump 68A to move swing motor 43 and/or hydraulic cylinder 32.

When two or more of the linear and/or rotary actuators receive flow from one or two of pumps 68A-68D, then displacement control of the pump(s) may be determined based on the meterless circuit receiving flow from the pump(s) having the higher load (pressure). For example, when a combined flow from pumps 68A and 68B is communicated in a closed loop manner to hydraulic cylinder 32 and swing motor 43, it may be desired to supply flow at a higher pressure to hydraulic cylinder 32 than swing motor 43. Thus, directional displacement of pumps 68A and 68B may be controlled to ensure that the higher pressure for hydraulic cylinder 32 is supplied. Displacement of swing motor 43 may be adjusted to meet its torque demand. As another example, when a combined flow from pumps 68A and 68B is communicated in a closed loop manner to hydraulic cylinder 32 and swing motor 43, it may be desired to supply flow at a higher pressure to swing motor 43 than hydraulic cylinder 32. Thus, directional displacement of pumps 68A and 68B may be controlled to ensure that the higher pressure for swing motor 43 is supplied. Flow to hydraulic cylinder 32 may be controlled by throttling flow to hydraulic cylinder 32 via switching valve arrangement 84.

Regeneration of fluid may be possible during retracting and/or extending operations of the linear actuators, such as hydraulic cylinder(s) 26, 32, 34, when the pressure of fluid exiting the hydraulic cylinder is higher than the pressure of fluid entering the hydraulic cylinder (e.g., when the pressure in first chamber 52 is higher than the pressure in second chamber 54 of hydraulic cylinder(s) 26, 32, 34 for the case of an overrunning retraction operation of the hydraulic cylinder). Specifically, during the retracting operation described above, both of makeup valves 94 for the respective hydraulic cylinder(s) 26, 32, 34 may be simultaneously moved toward their flow-passing positions. In this configuration, makeup valves 94 may allow some of the fluid exiting first chamber 52 to bypass pump(s) 68A-68D and flow directly into second chamber 54. During the extending operation, both makeup valves 94 may allow some of the fluid exiting second chamber 54 to bypass pump(s) 68A-68D and flow directly into first chamber 52. These operations may help to reduce a load on pumps 68A-68D, while still satisfying operator demands, thereby increasing an efficiency of machine 10. In some embodiments, makeup valves 94 may be held partially closed during regeneration to facilitate some energy dissipation that improves controllability.

Makeup valves 94 may also be used to allow flow to bypass pumps 68A-68D so that an operator of machine 10 may experience an "open-center" feel associated with control of the associated hydraulic cylinder(s) 26, 32, 34. For example, makeup valves 94 may be controlled to bypass flow when the load increases up to the point of stopping motion of the actuator, e.g., determined based on a monitored or sensed flow pressure. The "open-center" feel may provide the operator with a feel for the load on the hydraulic cylinder(s) 26, 32, 34.

In the disclosed embodiments of hydraulic system 56, flows provided by pumps 68A-68D may be substantially unrestricted such that significant energy is not unnecessarily wasted in the actuation process. Thus, embodiments of the disclosure may provide improved energy usage and conservation. In addition, the meterless operation of hydraulic system 56 may, in some applications, allow for a reduction or even complete elimination of metering valves for controlling fluid flow associated with the linear and rotary actuators. This reduction may result in a less complicated and/or less expensive system.

The disclosed hydraulic system may also provide for enhanced pump overspeed protection. In particular, during overrunning retracting or extending operations of hydraulic cylinders 26, 32, 34, when fluid exiting first chambers 52 (or second chambers 54) has elevated pressures, the highly-pressurized fluid may be rerouted back into second chambers 54 (or first chambers 52) via makeup valves 94, without the fluid ever passing through pumps 68A-68D. Not only does the rerouting help to improve machine efficiencies, but the bypassing of pumps 68A-68D may also reduce a likelihood of pumps 68A-68D overspeeding.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system comprising:
   a variable-displacement first pump;
   a variable-displacement second pump;
   a first actuator selectively connected either to the first pump in a closed loop manner and not the second pump, or to the first and second pumps in a closed loop manner;
   a second actuator selectively connected either to the second pump in a closed loop manner and not the first pump, or to the first and second pumps in a closed loop manner; and
   a variable-displacement rotary actuator selectively connected either to the first pump in a closed loop manner and not the second pump, or to the first and second pumps in a closed loop manner.

2. The hydraulic system of claim 1, wherein the first and second pumps are over-center pumps.

3. The hydraulic system of claim 1, wherein the first actuator is a linear actuator.

4. The hydraulic system of claim 1, wherein the first actuator is a second rotary actuator.

5. The hydraulic system of claim 1, further comprising:
at least one switching valve fluidly connected to at least one of the first actuator, the second actuator, or the rotary actuator;
wherein the at least one switching valve is configured to control an amount of fluid through a first actuator passage and a second actuator passage connected to the at least one of the first actuator, the second actuator, or the rotary actuator.

6. The hydraulic system of claim 5, wherein the at least one switching valve includes a spool switching valve configured to control the amount of fluid passing through the first actuator passage and the second actuator passage connected to the rotary actuator.

7. The hydraulic system of claim 5, wherein the at least one switching valve includes four independent metering valves configured to control the amount of fluid passing through the first actuator passage and the second actuator passage connected to at least one of the first actuator or the second actuator.

8. The hydraulic system of claim 1, wherein the first and second actuators are linear actuators, the hydraulic system further comprising:
at least one variable-displacement first switching valve connected to the first actuator and configured to allow fluid to be transferred between first and second chambers of the first actuator to facilitate fluid regeneration within the first actuator; and
at least one variable-displacement second switching valve connected to the second actuator and configured to allow fluid to be transferred between first and second chambers of the second actuator to facilitate fluid regeneration within the second actuator.

9. The hydraulic system of claim 1, wherein the first and second actuators are linear actuators, the hydraulic system further comprising:
at least one first switching valve fluidly connected to the first actuator; and
at least one second switching valve fluidly connected to the second actuator;
wherein, when the first and second pumps are simultaneously connected to at least one of the first and second actuators in a closed-loop manner, the at least one first switching valve is configured to meter flow to the first actuator and the at least one second switching valve is configured to meter flow to the second actuator to adjust directions of flow of the first and second actuators independently.

10. The hydraulic system of claim 9, wherein displacement of the rotary actuator is adjustable to control torque output of the rotary actuator while the directions of flow of the first and second actuators are independently adjustable via the at least one first switching valve and the at least one second switching valve.

11. The hydraulic system of claim 1, wherein the first actuator, the second actuator, and the rotary actuator are configured to simultaneously receive fluid from at least one of the first pump or the second pump so that the first actuator, the second actuator, and the rotary actuator move simultaneously.

12. The hydraulic system of claim 11, wherein, when the first actuator, the second actuator, and the rotary actuator simultaneously receive fluid from at least one of the first pump or the second pump, at least one of the first actuator, the second actuator, and the rotary actuator is configured to be connected in a closed loop manner to the first pump and the second pump.

13. The hydraulic system of claim 1, further comprising a combiner valve arrangement controllable to:
selectively connect the first actuator and the rotary actuator either to the first pump in a closed loop manner and not the second pump, or to the first and second pumps in a closed loop manner; and
selectively connect the second actuator either to the second pump in a closed loop manner and not the second pump, or to the first and second pumps in a closed loop manner.

14. The hydraulic system of claim 13, wherein the combiner valve arrangement includes four independent metering valves fluidly connected to the first pump, the second pump, the first actuator, the second actuator, and the rotary actuator.

15. The hydraulic system of claim 1, wherein:
the hydraulic system is provided in a machine including a body and an implement system; and
the first actuator is a hydraulic cylinder configured to move at least one of a stick of the implement system or a work tool of the machine;
the second actuator is a hydraulic cylinder configured to move a boom of the implement system; and
the rotary actuator is a swing motor configured to move the body.

16. The hydraulic system of claim 1, wherein:
the hydraulic system is provided in a machine including a drive system, the drive system including left traction device driven by a left travel motor and a right traction device driven by a right travel motor;
the first actuator is one of the left and right travel motors; and
the rotary actuator is the other one of the left and right travel motors.

17. The hydraulic system of claim 16, wherein the second actuator is a hydraulic cylinder configured to move the at least one of a stick of the implement system or a work tool of the machine.

18. A hydraulic system comprising:
a variable-displacement first pump;
a variable-displacement second pump;
a first actuator connected to the first pump in a closed loop manner;
a second actuator selectively connected to the second pump in a closed loop manner;
a variable-displacement rotary actuator selectively connected to the first pump in a closed loop manner;
a combiner valve arrangement configured to:
selectively connect and disconnect the second pump from the first actuator and the rotary actuator, and
selectively connect and disconnect the first pump from the second actuator; and
at least one switching valve fluidly connected to at least one of the first actuator, the second actuator, or the rotary actuator, the at least one switching valve being configured to control an amount of fluid passing through a first actuator passage and a second actuator passage connected to the at least one of the first actuator, the second actuator, or the rotary actuator.

19. A method of operating a hydraulic system, the method comprising:
pressurizing fluid with a first variable-displacement pump;
pressurizing fluid with a second variable-displacement pump, the first and second pumps being capable of simultaneously supplying pressurized fluid to at least three actuators, the at least three actuators including a variable-displacement rotary actuator, a linear actuator, and a third actuator;

selectively controlling whether to direct fluid pressurized by the first pump and the second pump to only one of the at least three actuators, to only two of the at least three actuators simultaneously, or to three of the at least three actuators simultaneously;

returning the pressurized fluid to the first and second pumps in a closed-loop manner;

adjusting displacement of the rotary actuator to control torque output of the rotary actuator; and metering the flow passing between the first and second pumps and the linear actuator to control movement of the linear actuator.

20. The method of claim 19, wherein the first and second pumps are capable of simultaneously supplying pressurized fluid to the rotary actuator, the linear actuator, the third actuator, and a fourth actuator; and the method further comprises:

selectively controlling whether to direct fluid pressurized by the first pump and the second pump to only one of the four actuators, to only two of the four actuators simultaneously, to only three of the four actuators simultaneously, or to all four of the actuators simultaneously.

\* \* \* \* \*